United States Patent [19]
Eschrich et al.

[11] Patent Number: 4,520,694
[45] Date of Patent: Jun. 4, 1985

[54] METHOD OF CONTROLLING ENGINE OPERATION IN AN AUTOMOTIVE VEHICLE DURING GEAR CHANGE

[75] Inventors: Gerhard Eschrich; Manfred Schwab, both of Gerlingen, Fed. Rep. of Germany

[73] Assignee: Robert Bosch GmbH, Stuttgart, Fed. Rep. of Germany

[21] Appl. No.: 427,132

[22] Filed: Sep. 29, 1982

[30] Foreign Application Priority Data

Dec. 24, 1981 [DE] Fed. Rep. of Germany ....... 3151252

[51] Int. Cl.³ .................... B60K 15/00; B60K 41/14; B60K 41/06
[52] U.S. Cl. ....................... 74/858; 74/857; 74/866; 74/872
[58] Field of Search ................. 74/858, 857, 856, 843, 74/859, 865, 866, 872, 873, 874; 192/0.033, 0.032, 0.08, 0.052, 0.092, 103 R; 364/424.1

[56] References Cited

U.S. PATENT DOCUMENTS

| 3,323,621 | 6/1967 | Peras | 74/858 X |
|---|---|---|---|
| 4,077,283 | 3/1978 | Hammond | 74/872 X |
| 4,226,141 | 10/1980 | Espenschied | 74/858 |
| 4,231,092 | 10/1980 | Grob et al. | 74/866 X |
| 4,266,447 | 5/1981 | Hees et al. | 74/858 |
| 4,370,904 | 2/1983 | Muller et al. | 74/866 X |
| 4,403,527 | 9/1983 | Mohl et al. | 74/872 X |
| 4,408,293 | 10/1983 | Avins | 364/424.1 X |

FOREIGN PATENT DOCUMENTS

| 2848624 | 5/1980 | Fed. Rep. of Germany. | |
| 3026742 | 2/1982 | Fed. Rep. of Germany. | |
| 2448077 | 10/1980 | France | 74/866 |
| 55-8949 | 1/1980 | Japan | 74/866 |

Primary Examiner—Leslie A. Braun
Assistant Examiner—Arthur T. Quiray
Attorney, Agent, or Firm—Frishauf, Holtz, Goodman & Woodward

[57] ABSTRACT

To effect soft gear change, without shifting jolts or shocks, the output torque of an automotive vehicular internal combustion engine is controlled in dependence on sensing of an overrunning condition signal derived, for example, by the conjunction of the accelerator pedal being in "idle" or "unoperated" condition, and the engine operating at a speed in excess of idling speed. Use of such an "overrunning condition" signal permits ready control of the engine without requiring additional control elements or systems coupled to the gear change apparatus or to the transmission.

5 Claims, 1 Drawing Figure

METHOD OF CONTROLLING ENGINE OPERATION IN AN AUTOMOTIVE VEHICLE DURING GEAR CHANGE

Reference to related patent, assigned to the assignee of the present application, the disclosure of which is hereby incorporated by reference:
U.S. Pat. No. 4,266,447, HEESS et al., May 12, 1981.
Reference to publication:
German Patent Disclosure Document DE-OS No. 30 26 742, MOHL and SCHWAB, published Feb. 18, 1982.

The present invention relates to a method of operating the internal combustion of a vehicle which is equipped with jolt control apparatus described in U.S. Pat. No. 4,266,447, of which co-inventor Schwab herein is a co-inventor, which permits improved operation with different types of transmissions without, essentially, increasing the requirements for apparatus and structural hardware.

BACKGROUND

The referenced U.S. Pat. No. 4,266,447, the disclosure of which is hereby incorporated by reference, describes apparatus and method to control an automotive-type stepped transmission, in which the torque supplied by the engine is reduced during gear change. This reduction in supplied power can be obtained by reducing fuel supply or, for example, adjusting ignition timing, typically in retardation direction. Reducing the fuel supply during gear shifting permits particularly soft and smooth engagement of gears, and thus reduces shifting jolts.

Various types of drive trains of automotive vehicles include systems in which the engine speed is sensed; and, additionally, the direction of power transfer within the drive train is determined. If the power is from the engine to the driven wheels through the transmission, the engine is controlled to operate in accordance with traffic requirements, as commanded by the operator. If the transfer of power, however, is in the reverse direction, for example upon coasting downhill, under engine braking conditions, or the like, collectively and usually referred to as "overrunning" condition of the vehicle and drive train, a signal 13s can be developed indicating this overrunning condition. Based on this signal, and to save fuel and not operate the engine at speeds which may be determined by the engaged gear, the torque output of the engine can be reduced based on such sensed signal.

THE INVENTION

It is an object to so operate an automotive engine that minimum fuel supply and minimum engine power only are developed during gear shifting, utilizing available equipment and apparatus within the drive train 100 of a vehicle.

Briefly, fuel supply to the engine is reduced when an output signal representative of sensed overrunning condition is derived; and the gear shift control apparatus, which controls engine operation, simulates for the engine idle operation conditions, thus causing reduction in output power, typically by reducing fuel supply of the engine.

This method has the advantage that the reduction in torque from the engine, during gear shifting, is obtained by utilizing equipment and apparatus already present, namely engine fuel supply reduction to engine idling upon sensing of overrunning condition. Consequently, no further apparatus is necessary in the gear shift control apparatus to affect operation of the engine.

The system is particularly applicable in combination with hybrid manual-automatic transmissions in which an automatic overdrive is included with a transmission which, otherwise, is manually controlled. Gear shifting, e.g. overdrive, can be controlled by sensing engine speed and vehicle speed; beginning and ending gear shifting operations can be controlled based on engine speed parameters by utilizing, for example, the apparatus in the referenced U.S. Pat. No. 4,266,447, with only minor modifications. In accordance with a feature of the invention, a manual transmission, with automatic overdrive, coupled thereto, can be controlled by the system of the referenced patent. Controlling engine operation to idling speed, based on sensed overrunning condition, is particularly applicable with such hybrid manual-automatic gear shift systems since the automatic portion of the gear shift system usually is comparatively simple and, thus, control also should require only a minimum of constructional elements.

DRAWING

FIG. 1 is a schematic diagram of an apparatus suitable for practising the method of the present invention.

DETAILED DESCRIPTION

Figure 1:
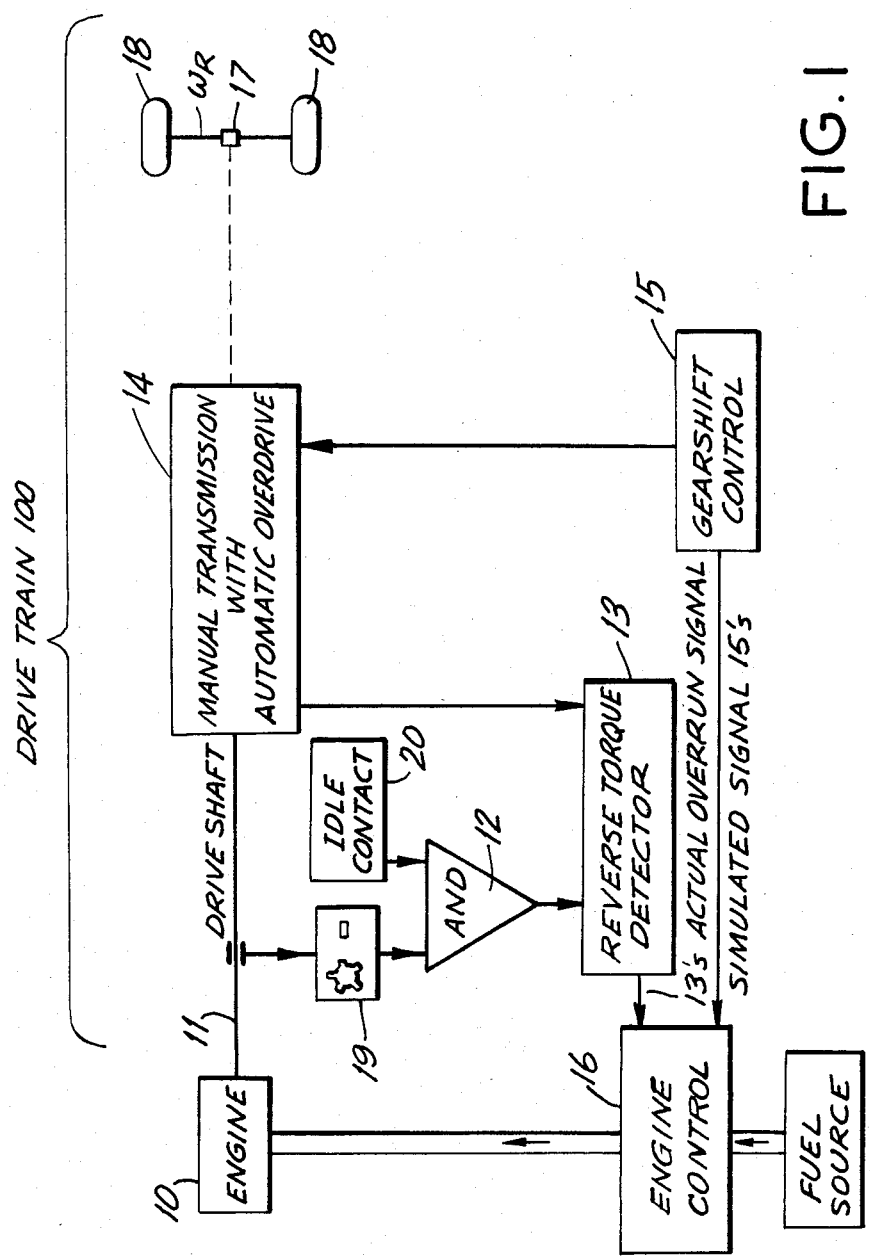

The referenced U.S. Pat. No. 4,266,447 describes reduction of engine torque during gear shifting, applicable to automatic stepped gears or transmissions, as well as to manually controlled transmissions. The system is also and particularly applicable for use with a manual transmission 14 which includes an automatically engageable overdrive. The use of the transmission described in the foregoing patent with automatic overdrive has been published, see the referenced German Patent Disclosure Document DE-OS 30 26 742, the structure of which is identical to that disclosed in the foregoing U.S. Pat. No. 4,266,447, and adapted to use with an automatic overdrive. Of course, the method of the present invention is not limited to the particular system and method as described in the foregoing U.S. Pat. No. 4,266,447, but can be applied to other types of drives, for example in which the control of the internal combustion (IC) engine is determined differently than previously published, or in which other types of gears or transmission are being used.

Many modern vehicles have overrunning sensing apparatus 13 coupled to the transmission, in which an output signal 13s is derived when the vehicle operates under overrunning conditions. Such devices recognize reverse torque, that is, from the wheels 18 to the engine 10, and respond, for example, if:

(1) an "idle contact" 20, coupled to the accelerator pedal which is operator controlled, senses that no power is demanded from the engine—that is, the pedal is under "idle" condition, and (2) the engine speed is above a predetermined minimum speed, for example above idling speed.

Under those two conditions, it is recognized that the operator does not require power, but that the engine is operating at a higher than idling speed, that is, that the engine is being driven by the wheels of the vehicle, rather than the wheels being driven by the engine—a condition referred to as "overrunning" condition. Recogniton of engine speed above a predetermined level—for example idling—and idle position of the accelerator pedal, both represented by electrical signals, and logically combined in an "AND" function 12—see the above analysis—thus provides an "overrunning condition" signal 13s.

In accordance with the present invention, such an overrunning signal deriving system—present in automatic transmissions of this type—is used to insure soft gear changing by utilizing this "overrunning" signal 15s to control the gear change operation. In accordance with a feature of the invention, an automatic transmission control 15 is so improved that, during gear changing, the engine torque is reduced by simulating an operating condition which results in response by the overrunning condition signal sensing system. Thus, the timing, and particularly gear change or gear switching timing, or switching pressures, for example hydraulic pressures within an automatic transmission, can be controlled to reduce switching jolts or shocks by reducing the engine torque being supplied by the engine. This reduction in torque is obtained by reducing fuel supply thereto, and the reduction of fuel supply is controlled by the engine control 16 which senses the overrunning condition signal 15s, rather than providing additional elements to control engine operation as a function of gear shifting.

The method is particularly applicable in vehicles which utilize electronically controlled gear shifting apparatus 15, and additionally have an overrunning sensing device 13 which provides an "overrunning" signal upon conjunction of operator control pedal in idle position and engine speed above a predetermined limit, for example idling speed. Thus, soft gear changing can be obtained without requiring additional engine control apparatus.

We claim:

1. In an automotive vehicle having an engine (10), an accelerator pedal, and a drive train (100),
   a method of controlling the drive train of the vehicle, said drive train (100) having
   a transmission (14) driven by the engine (10), and vehicle wheels (18) driven by the transmission (14), wherein the drive train includes means (13) for sensing the direction of power flow between the engine (10) and the wheels (18), and provides an output signal (13s) if the vehicle is operated under overrunning condition,
   comprising the step of
   reducing power output of the engine to idling level by producing a simulated overrunning condition signal (15s) during occurrence of a gear change step for a period of time adjusted in accordance with then-pertaining engine speed parameters.

2. Method according to claim 1, including the steps of sensing (19) speed of the engine;
   sensing (20) the position of said accelerator pedal; and
   providing an actual overrunning condition output signal (13s) when
   (a) said pedal is in "idle" position, and
   (b) engine speed is above idling speed.

3. Method according to claim 1, wherein
   the drive train comprises an overdrive;
   and wherein, upon gear change including said overdrive, said simulated overrunning condition signal (15s) is applied to the engine to cause reduction of power output from the engine.

4. Method according to claim 3, wherein the step of reducing power output comprises reducing fuel supply to the engine.

5. Method according to claim 1, including the step of reducing fuel supply to the engine upon sensing the simulated overrunning condition output signal upon initiation and during a gear change step.

* * * * *